United States Patent
Sheng et al.

(10) Patent No.: US 10,255,944 B2
(45) Date of Patent: Apr. 9, 2019

(54) SYSTEMS AND METHODS FOR READING AND DECODING ENCODED DATA FROM A STORAGE DEVICE

(71) Applicant: Marvell World Trade Ltd., St. Michael (BB)

(72) Inventors: Hongying Sheng, San Jose, CA (US); Panu Chaichanavong, Sunnyvale, CA (US); Gregory Burd, San Jose, CA (US)

(73) Assignee: Marvell World Trade Ltd., St. Michael (BB)

( * ) Notice: Subject to any disclaimer, the term of this patent is extended or adjusted under 35 U.S.C. 154(b) by 226 days.

(21) Appl. No.: 13/915,858

(22) Filed: Jun. 12, 2013

(65) Prior Publication Data

US 2014/0002918 A1    Jan. 2, 2014

Related U.S. Application Data

(60) Provisional application No. 61/665,127, filed on Jun. 27, 2012.

(51) Int. Cl.
| | |
|---|---|
| *G06F 13/12* | (2006.01) |
| *G06F 13/28* | (2006.01) |
| *G11B 20/12* | (2006.01) |
| *G11B 20/14* | (2006.01) |

(52) U.S. Cl.
CPC ...... *G11B 20/1217* (2013.01); *G11B 20/1426* (2013.01); *G11B 2220/2516* (2013.01)

(58) Field of Classification Search
CPC ............. G06F 3/00; G06F 7/53; G06F 9/3822
USPC ...... 710/20; 375/240.23; 712/212, 215, 218; 360/46; 341/51, 65
See application file for complete search history.

(56) References Cited

U.S. PATENT DOCUMENTS

| | | | | |
|---|---|---|---|---|
| 5,630,083 | A * | 5/1997 | Carbine et al. ............... | 712/212 |
| 5,675,332 | A * | 10/1997 | Limberg ............... | H03M 7/425 |
| | | | | 341/65 |
| 5,715,262 | A * | 2/1998 | Gupta ................. | H03M 13/151 |
| | | | | 714/784 |
| 6,191,902 | B1 * | 2/2001 | Hashimura et al. ............ | 360/46 |
| 6,192,465 | B1 * | 2/2001 | Roberts ......................... | 712/212 |
| 6,212,621 | B1 * | 4/2001 | Mahalingaiah ............... | 712/212 |
| 6,807,624 | B1 * | 10/2004 | Asakawa ....................... | 712/215 |
| 2002/0015533 | A1 * | 2/2002 | Nakamura ............ | H04N 19/61 |
| | | | | 382/245 |
| 2003/0067699 | A1 * | 4/2003 | Thomson et al. .............. | 360/46 |
| 2004/0052191 | A1 * | 3/2004 | Sako et al. ................. | 369/59.25 |
| 2004/0093485 | A1 * | 5/2004 | Nguyen et al. ............... | 712/218 |

(Continued)

FOREIGN PATENT DOCUMENTS

GB    1526828 A    * 10/1978    .......... G06F 3/0601

*Primary Examiner* — Idriss N Alrobaye
*Assistant Examiner* — Henry W Yu

(57) ABSTRACT

Systems and methods of reading data from a storage device are provided. A first codeword and a second codeword are read from a storage device, where the second codeword is positioned after the first codeword. The first and second codewords are decoded in parallel, and the decoding of the second codeword completes before the decoding of the first codeword completes. The decoded second codeword and a signal indicating whether the decoding of the second codeword is complete are transmitted to control circuitry before the decoding of the first codeword completes.

22 Claims, 4 Drawing Sheets

(56) References Cited

U.S. PATENT DOCUMENTS

| | | | |
|---|---|---|---|
| 2005/0147174 A1* | 7/2005 | Iwata | 375/240.23 |
| 2005/0197065 A1* | 9/2005 | Tamaki | H04L 1/0003 |
| | | | 455/42 |
| 2006/0027657 A1 | 2/2006 | Ninnick et al. | |
| 2010/0123607 A1* | 5/2010 | He | H03M 7/30 |
| | | | 341/51 |

* cited by examiner

SYSTEMS AND METHODS FOR READING AND DECODING ENCODED DATA FROM A STORAGE DEVICE

CROSS REFERENCE TO RELATED APPLICATION

This disclosure claims the benefit of commonly-assigned U.S. Provisional Patent Application No. 61/665,127, filed Jun. 27, 2012, which is hereby incorporated by reference herein in its entirety.

FIELD OF USE

This disclosure relates to a method and system for reading and decoding data from a storage device. More particularly, this disclosure relates to an optimized process for transmitting decoded codewords read from the storage device to a host controller.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted as prior art against the present disclosure.

This disclosure relates to a method and system for reading from a storage device. Data is stored in various different data sectors on storage devices. Read commands are transmitted to read and decode codewords stored in these different sectors. One of the factors that determines the amount of decoding time required to decode a codeword is the signal-to-noise ratio (SNR) associated with the read operation for that given codeword.

In magnetic recording, as one example of a type of recording, codewords are read and decoded sequentially based on the position of the codeword in a read command that lists the order in which particular codewords are to be read from the storage device. As a result of the applied read command, a read channel reads and attempts to decode the codeword. Depending on the SNR of the read operation for a particular codeword, certain codewords may require a longer period of time to complete decoding than other codewords with higher SNRs.

The traditional systems for reading and decoding codewords from storage devices are inefficient. Codewords that are read from the storage device are input to a two codeword decoder engine. Upon completion of decoding, codewords must be stored in the read channel until all codewords input to the decoder engine before them have completed decoding. Accordingly, a particular codeword that takes a longer time than others to be decoded delays output of the others until the particular codeword completes decoding. The read channel can only be flushed of decoded codewords once the earlier input codeword completes decoding. These systems not only require a large memory for the read channel, but in the event that the read channel runs out memory, decoding of earlier input codewords have not finished being decoded may have to be aborted to flush out the codewords that have already completed decoding.

SUMMARY

Systems and methods are provided for reading data from a storage device.

In some embodiments, a first codeword and a second codeword are read from the storage device. The second codeword may be positioned on the storage device after the first codeword. The first codeword and the second codeword may be decoded in parallel. The decoding of the second codeword may complete before the decoding of the first codeword completes. The decoded second codeword and a signal indicating whether decoding of the second codeword is complete may be transmitted to control circuitry before the decoding of the first codeword completes. The signal may indicate a position of the second codeword with respect to the first codeword.

In certain implementations, the signal indicating whether decoding of the second codeword is complete may include a tag identifying the position of each codeword with respect to other codewords in the storage device.

In certain implementations, the control circuitry may transmit an input signal to the storage device, initiating the first codeword and the second codeword to be read from the storage device. The input signal may include a tag identifying the order in which the first codeword and the second codeword are to be decoded.

In certain implementations, the control circuitry may determine that the second codeword has been decoded and that the decoding of the first codeword has not completed. A minimum length signal indicating that the first codeword has not completed decoding may be transmitted to control circuitry.

In certain embodiments, a system for reading data from a storage device is disclosed. The system includes a read channel configured to read a first codeword and a second codeword from the storage device. The second codeword may be positioned on the storage device after the first codeword. The read channel is further configured to decode the first codeword and the second codeword in parallel. The decoding of the second codeword may complete before the decoding of the first codeword completes. The read channel is further configured to transmit the decoded second codeword and a signal indicating whether decoding of the second codeword is complete to control circuitry before the decoding of the first codeword completes. The signal may indicate a position of the second codeword with respect to the first codeword.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

This disclosure describes an interface between a host controller and a read channel (RDC). Such an interface, between the host controller (e.g., a hard disk controller) and the read channel, accommodates signaling used to read and decode encoded data from a storage device. For illustrative purposes, this disclosure is described in the context of a hard disk drive storage device. However, it should be understood that the teachings of this disclosure are equally applicable to any other electronic storage system (e.g., a solid stare drive, a non-volatile storage device, or an optical disk).

Systems and methods are provided for enhancing the performance of hard drive read channels that read and decode data stored in the hard drive. Data is stored in various sectors of hard disk drives. During a read operation, a host controller instructs a read channel to read data from several different sectors of the hard drive. Such data stored in the hard drive is encoded. Some examples of popular encoding schemes are frequency modulation, modified frequency modulation, and run-length limited encoding. The host controller instructs the read channel to read and decode such data from the storage device. Once data that is read from the storage is decoded by the read channel, it is passed to the host controller. The host controller transmits this decoded data to an appropriate memory unit off chip for use by the requesting processor or application.

Encoding generally refers to the process of generating data in a manner that facilitates subsequent detection and/or correction of errors in the data, while decoding generally refers to the counterpart process of detecting and/or correcting the errors. The elements of a coding system that perform encoding and decoding are likewise referred to as encoders and decoders, respectively.

Figure 1:
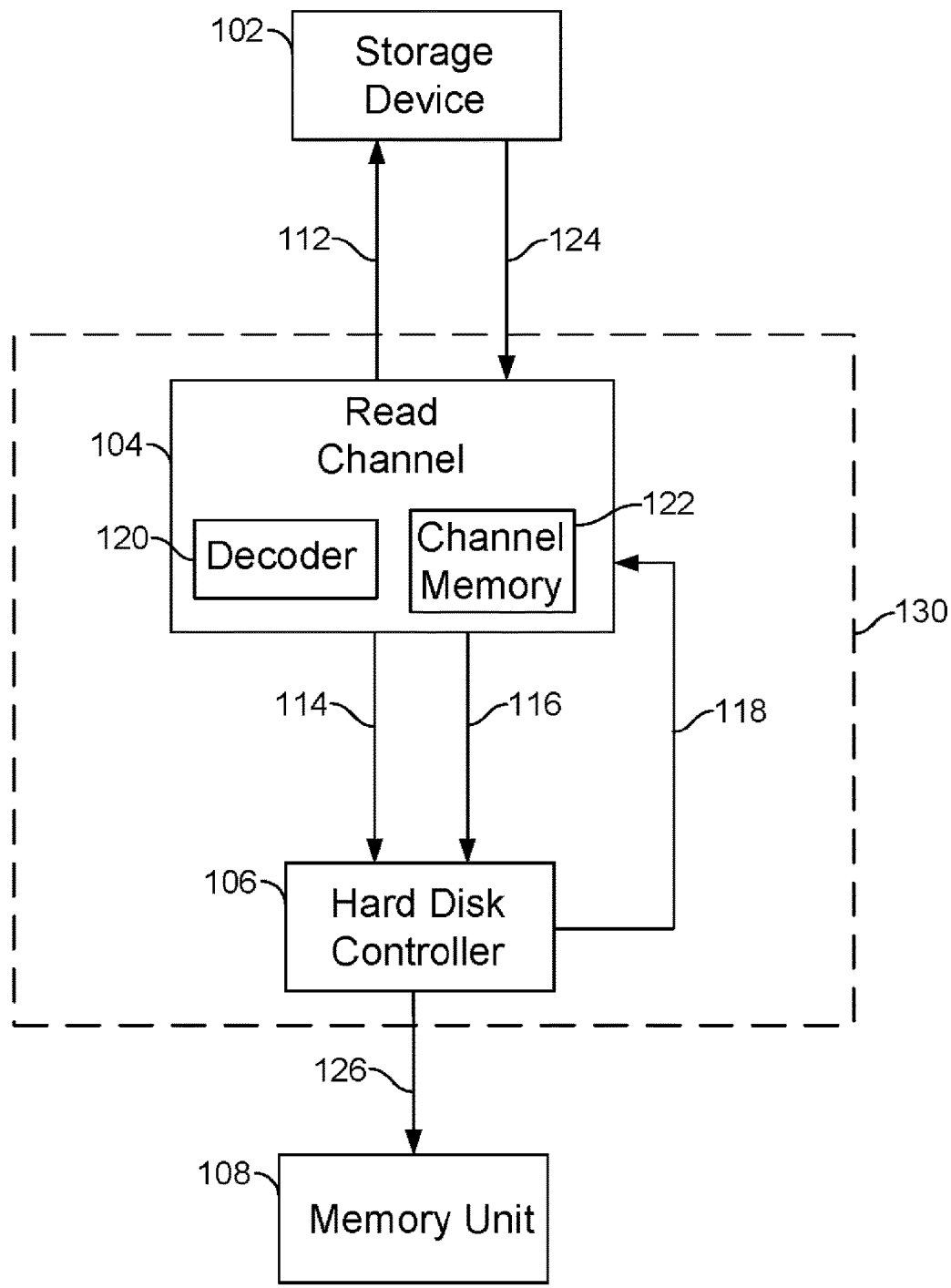
FIG. 1 shows a schematic view of an illustrative decoding system that reads and decodes codewords from a storage device in accordance with several embodiments of the present disclosure.

FIG. 1 shows an illustrative system 100 in accordance with some embodiments of the present disclosure. System 100 includes storage device 102, read channel 104, hard disk controller 106, and memory unit 108. Memory unit 108 may include an electronic storage device (e.g., flash memory device, random access memory device, programmable logic device, non-volatile memory, volatile memory, FeRAM, CBRAM, PRAM, SONOS, RRAM, Racetrack memory, NRAM and Millipede storage devices). Storage device 102 may be a magnetic hard disk drive, a solid state drive, a non-volatile storage device, or an optical disk. Storage device 102 may be divided. into several different sectors on which encoded data is stored. Read channel 104 includes decoder 120 and channel memory 122. Read channel 104 and hard disk controller 106 are the components that are physically located on system on chip 130.

In several embodiments, a read operation is initiated when hard disk controller 106 instructs read channel 104 to read particular sectors of storage device 102 in an ordered sequence. Once read channel 104 receives read command 118 from hard disk controller 106, read channel 104 accesses storage 102 and reads the encoded data in the order specified by read command 118. In particular, read channel 104 issues a data retrieval command 112 to storage device 102. Data retrieval command 112 may be identical to read command 118. Read channel 104 receives encoded data 124 that has been read from storage device 102. Once read channel 104 receives the encoded data 124 from storage device 102, read channel 104 passes the encoded codewords into decoder 120. Decoder 120 may be a multi-decoder engine that decodes multiple codewords from encoded data 124 in parallel. Alternatively, decoder 120 may be a sequential decoder that handles one codeword at a time.

In several embodiments, one of the codewords being decoded in decoder 120 may take a longer time to decode than other codewords being decoded. Codewords received by decoder 120 with a low SNR often take a longer period of time to decode than signals with high SNR. Once the codeword finishes decoding before another codeword completes decoding, decoded codeword 114 is transmitted from read channel 104 to hard disk controller 106. For example, read command 118 may specify instruct read channel 104 to read three codewords: Codeword A, Codeword B, and Codeword C, in that sequential order. However, Codeword A may have a low SNR and may take longer to complete decoding than Codewords B and C. According to several embodiments, read channel 104 may decode Codeword A and Codeword B in parallel. Although Codeword A is the first codeword in read command 118, once Codeword B finishes decoding, read channel 104 will transmit decoded Codeword B to hard disk controller 106. Codeword C will be input into the decoding circuitry that was previously decoding Codeword B while Codeword A continues to be decoded.

In addition to transmitting decoded codewords to hard disk controller 106, read channel 104 also transmits a valid read signal 116 to hard disk controller 106 indicating that a particular codeword was successfully read and decoded. Hard disk controller 106 subsequently stores decoded codeword 126 in memory unit 108. Memory unit 108 may be a large volatile or non-volatile memory found off chip such as a double data rate random access memory (DDR RAM). Decoded data 126 may be used for various processes or applications that requested data to be read from storage device 102.

In some embodiments, read channel 104 stores encoded codeword 124 read from storage device 124 that has not yet been input into decoder 120 in channel memory 122. For example, if read channel 104 determines that there is an overabundance of received encoded codewords 124 from storage 102 and that all decoders of the multiple decoding engine 120 are currently busy decoding a codeword, read channel will store incoming codewords 124 being read from storage device 102 in channel memory 122. Alternatively, read channel 104 may store certain codewords that require further more than one iteration of decoding in channel memory 122. For instance, if read channel 104 determines that decoder 120 is unable to successfully decode a codeword in one iteration, read channel 104 may store the partially decoded codeword in channel memory 122 before the partially decoded codeword is decoded again.

Figure 2:
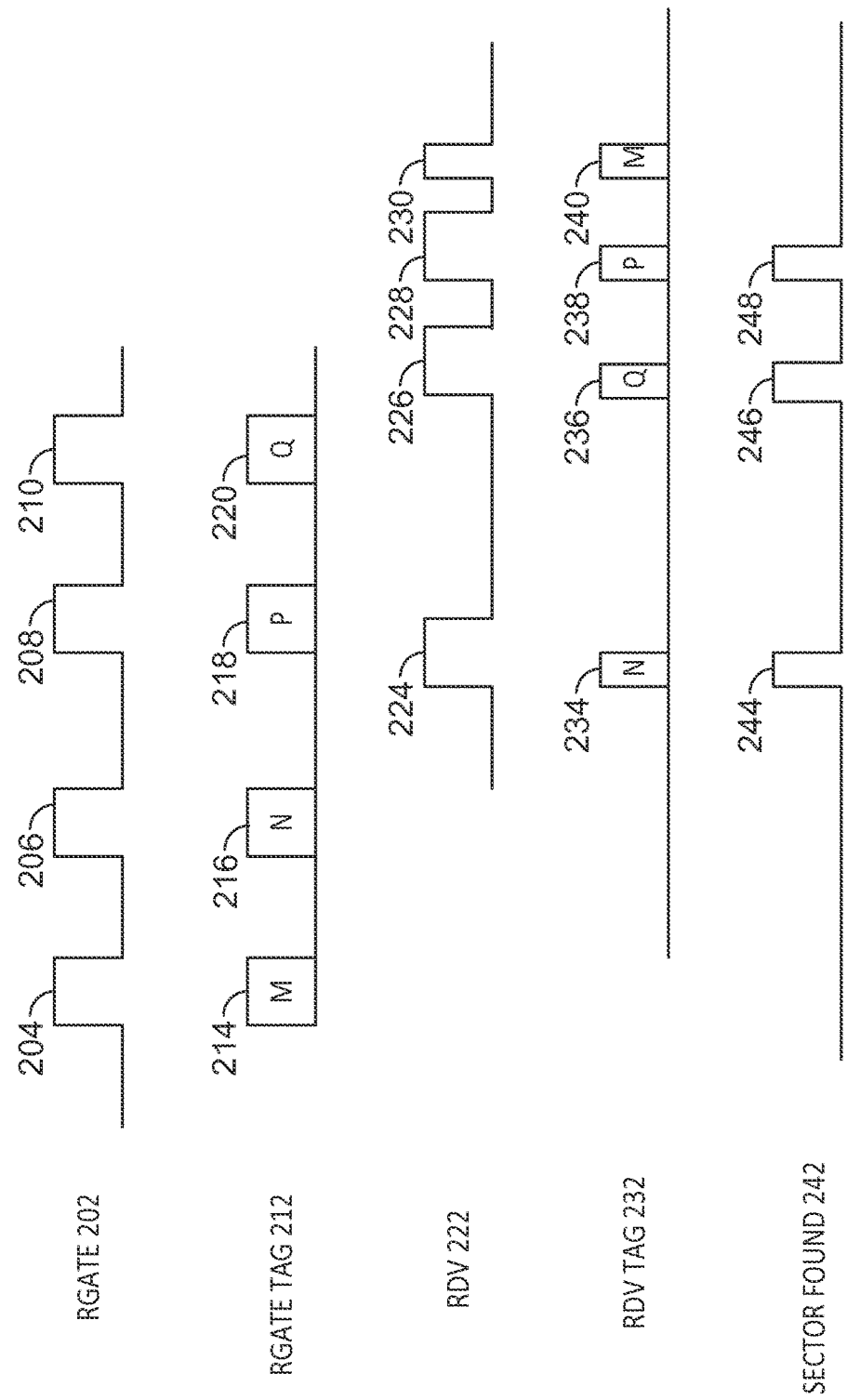
FIG. 2 shows several signals that are passed between the various components of the decoding system during operation of read and decoding operations in accordance with several embodiments of the present disclosure.

FIG. 2 shows an illustrative set of signals used by the HDC-RDC system 100 to read and decode codewords from storage device 102 according to several embodiments. RGATE 202 and RGATE TAG 212 are components of signal 118 of FIG. 1. RDV 222 and RDV TAG 232 are components of signal 116 of FIG. 1.

Hard disk controller 106 instructs read channel 104 to read encoded data on storage device 102 by transmitting a signal (RGATE) 202 to read channel 104. FIG. 2 illustrates a possible RGATE signal 202 transmitted to read channel 104. RGATE 202 includes pulses 204, 206, 208, and 210. Each of these RGATE pulses corresponds to a read command to read a particular codeword stored in a given sector of storage device 102. In addition to transmitting RGATE 202, hard disk controller 106 also transmits RGATE TAG 212 to read channel 104. RGATE TAG 212 contains pulses 214, 216, 218, and 220, which contain tags for pulses 204, 206, 208, and 210 of RGATE 202, respectively. Each of the RGATE TAG 212 pulses includes a tag identifier that is associated with its accompanying RGATE 202 pulse. By assigning tags to the read commands, hard disk controller 106 can keep track of the codewords in a manner that is independent of their position in the RGATE 202 signal.

Once read channel 104 receives the RGATE and RGATE TAG signals and transmits data retrieval command 112 to storage 102, storage device 102 transmits coded data 124 to read channel 104. Once read channel 104 decodes the data using decoder 120, read channel 104 transmits the decoded codewords to hard disk controller 106. The signal including the decoded codeword, RDATA 114, includes the decoded codewords.

In addition to transmitting RDATA 114 to hard disk controller 106, read channel 104 also transmits valid read signal (RDV) 116 to hard disk controller 106. RDV 222 and RDV TAG 232 combined compose this valid read (RDV) signal. RDV 222 contains pulses 224, 226, 228, and 230, each of which indicates whether a corresponding codeword was successfully decoded. RDV TAG 232 contains pulses 234, 236, 238, and 240, which contain tags for pulses 224, 226, 228, and 230 of RDV 232, respectively. An RDV tag identifies the codeword. associated with the RDV pulse corresponding to the RDV tag. Such a system of tagging the RDV pulses allows data to be flushed out of the read channel out of the initial order that was specified in the RGATE 202 read command.

An RDV pulse will be generated for each codeword, regardless of whether it was successfully decoded. Hard disk controller 106 uses the RDV pulse along with RDATA received from read channel 104 to generate the decoded codeword in its final form as signal 126 to transmit to memory unit 108. RDV signal 222 indicates if a codeword it is associated with was successfully decoded by a virtue of the length of the RDV pulse. If read channel 104 determines that a codeword was not successfully decoded, read channel 104 generates a minimum length RDV pulse. In the embodiment depicted in FIG. 2, read channel generates an RDV pulse with a pulse length of 16 clock cycles for any codeword that it determines did not successfully complete decoding. On the other hand, read channel 104 generates RDV pulses with pulse lengths that are proportionate to the size of the storage device sector that the codeword was found in for codewords that read channel 104 determines were successfully decode.

In the example shown in FIG. 2, RGATE 202 includes instructions to read and decode codewords M, N, P, and Q, which are indicated by pulses 214, 216, 218, and 220 of RGATE TAG 212, respectively. By generating RGATE TAG 212, hard disk controller 106 sets a convention for tagging the codewords to be read. The decoded data read from the storage unit, when received at the hard disk controller 106, can be interpreted by checking the tags of the decoded codewords to determine which codeword is being received even if the codeword is out of the initial order specified by RGATE 202. In this example, codeword M is the signal with the lowest SNR, and therefore takes the longest to decode. While codeword M is being decoded in one decoder of the multi-decoder engine, at least one of codewords N, P, and Q are also being decoded in parallel with codeword M. While codeword N completes decoding, codeword M continues to decode. The second decoder begins decoding codeword P upon completion of decoding of codeword N, while the first decoder is occupied with decoding codeword M. Once codeword N completes decoding, read channel 104 transmits the decoded codeword N in the RDATA 114 stream and also transmits RDV pulse 224 in RDV signal 222. Read channel also transmits RDV TAG pulse 234 accompanying Roy pulse 224 in order to identify the codeword associated with RDV pulse 224. Hard disk controller receives the decoded codeword N in RDATA 114, RDV pulse 224, and RDV to pulse 234 and is able to identify RDV pulse 224 and the decoded codeword as codeword N by examining the received tag pulse. In this example, codewords N, P, and Q are decoded successfully while codeword M is attempted to be decoded. Read channel 104 transmits the decoded codewords N, P, and Q in RDATA 114, RDV pulses 224, 226, 228, RDV tag pulses 234, 236, and 238 to hard disk controller 106 before codeword M completes decoding. If after attempting to decode codeword M, decoder 120 is unsuccessful and cannot properly decode codeword M, read channel 104 transmits an HDV pulse 230 accompanied. by RDV tag 240 indicating that codeword M was not successfully decoded. Hard disk controller 106 examines the length of the received RDV tags to determine whether a particular codeword was successfully decoded. By determining that RDV pulse 230 was the minimum RDV length of 16 clock cycles, hard disk controller determines that codeword M was not properly decoded. However, hard disk controller 106 examines the length of RDV pulses 234, 236, and 238 and determines that codewords N, P, and Q were successfully decoded.

Once read channel 104 determines which codewords were successfully decoded, read channel 104 can generate SECTOR FOUND signal 242 to identify which sectors have converged. If all the codewords in a sector of storage device 102 are found, then that sector is considered to be a converged sector. For example, read channel can determine that the sector containing codeword M did not converge since codeword M was not successfully decoded. Accordingly, read channel 104 does not send a pulse indicating that the sector associated with codeword M was found. However, read channel 104 does indicate that sectors for codewords N, P, and Q were found with SECTOR FOUND pulses 244, 246, and 248. SECTOR FOUND 242 is generated by read channel 104 and is used to generate RDV pulses. For instance, if read channel 104 determines that a SECTOR FOUND pulse is not sent for a particular codeword, read channel 104 will generate a minimum length RDV pulse for that associated codeword. On the other hand, if read channel 104 determines that a SECTOR FOUND pulse exists for a codeword, read channel 104 will generate a non-minimal length RDV pulse for that codeword.

Read channel 104 is capable of transmitting decoded codewords, RDV signals, and RDV tags associated with those decoded codewords to hard disk controller 106 as soon as decoder 120 completes decoding the codeword. Since transmitting codewords out of order is supported, more information can be transmitted to hard disk controller 106 quickly and system 100 requires less channel memory 122 usage. This is because systems that require all of the codewords to be decoded before transmitting the decoded codewords to hard disk controller 106 use more memory to store the decoded codewords before they are transmitted to hard disk controller 106. These factors lead to a more efficient reading and decoding process. Such an out of order transmission of codewords is supported since hard disk controller 106 initially tags the codewords using RGATE TAG 212. Read channel 104 generates those same tags for its decoded codewords and RDV 222, by means of RDV TAG 232. Hard disk controller 106 is able to identify the decoded codewords 114 and RDV 222 by comparing RDV TAG pulses against the RGATE TAG pulses. Once hard disk controller 106 has all the necessary codewords, it can transmit the decoded codewords 126 to memory unit 108.

Figure 3:
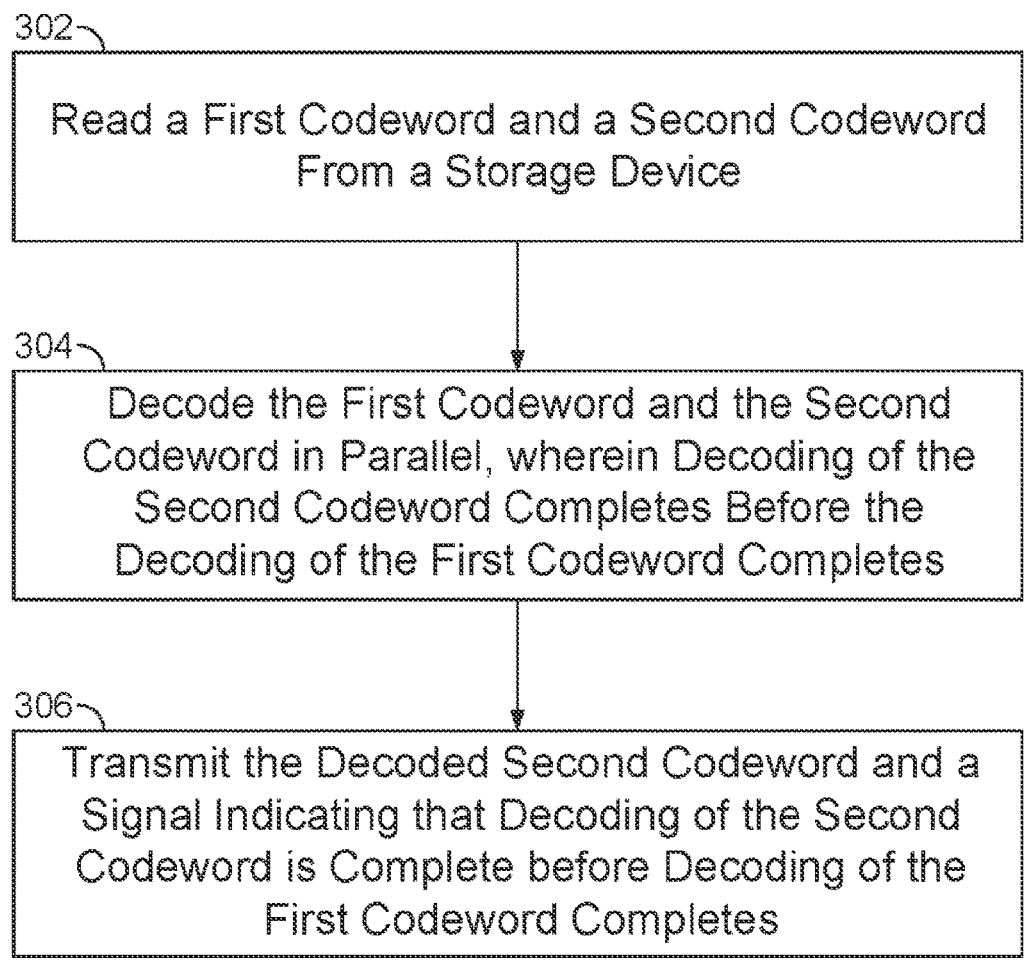
FIG. 3 shows an illustrative process that is used to read and decode codewords from a storage device in accordance with several embodiments of the present disclosure.

FIG. 3 depicts the process that is used to read and decode codewords from a storage device. At 302, read channel 104 reads a first and a second codeword from storage device 102. Read channel 104 reads the first and the second codeword upon being instructed by read command RGATE 202.

At 304, decoder 120 decodes the first codeword and the second codeword in parallel, wherein decoding of the second codeword completes before decoding of the first codeword completes. For instance, the first codeword has a lower SNR than the second codeword and therefore it takes decoder 120 a longer time to decode the first codeword than the second codeword. Since decoder 120 is a multi-decoder engine, as soon as the second codeword completes decoding, a third codeword is input into the decoder that was decoding the second codeword.

At 306, read channel 104 transmits the decoded second codeword and a signal indicating that decoding of the second codeword is complete before decoding of the first codeword completes. For instance, as soon as decoding of the second codeword is completed, read channel 104 generates an RDV pulse for the second codeword of a length proportionate to the size of the hard drive sector in which the second codeword was read from. Read channel 104 also generates the RDV TAG pulse indicating that the RDV pulse is associated with the second codeword. Subsequently, read channel 104 transmits the decoded second codeword, its associated RDV pulse, and the associated RDV TAG pulse to hard disk controller 106. All of this information is transmitted by read channel 104 to hard disk controller 106 while the first codeword is still being decoded. A first decode completion, first out system such as system 100 increases the speed or the read and decode operations by transmitting codewords as they are decoded to hard disk controller 106. Codewords that have completed decoding are no longer held in a read channel memory cell until a low SNR codeword finishes decoding. The first decode completion, first out system of system 100 also reduces the amount of read channel memory required to store the codewords that have completed decoding but must be held until a previously position codeword completes decoding.

Figure 4:
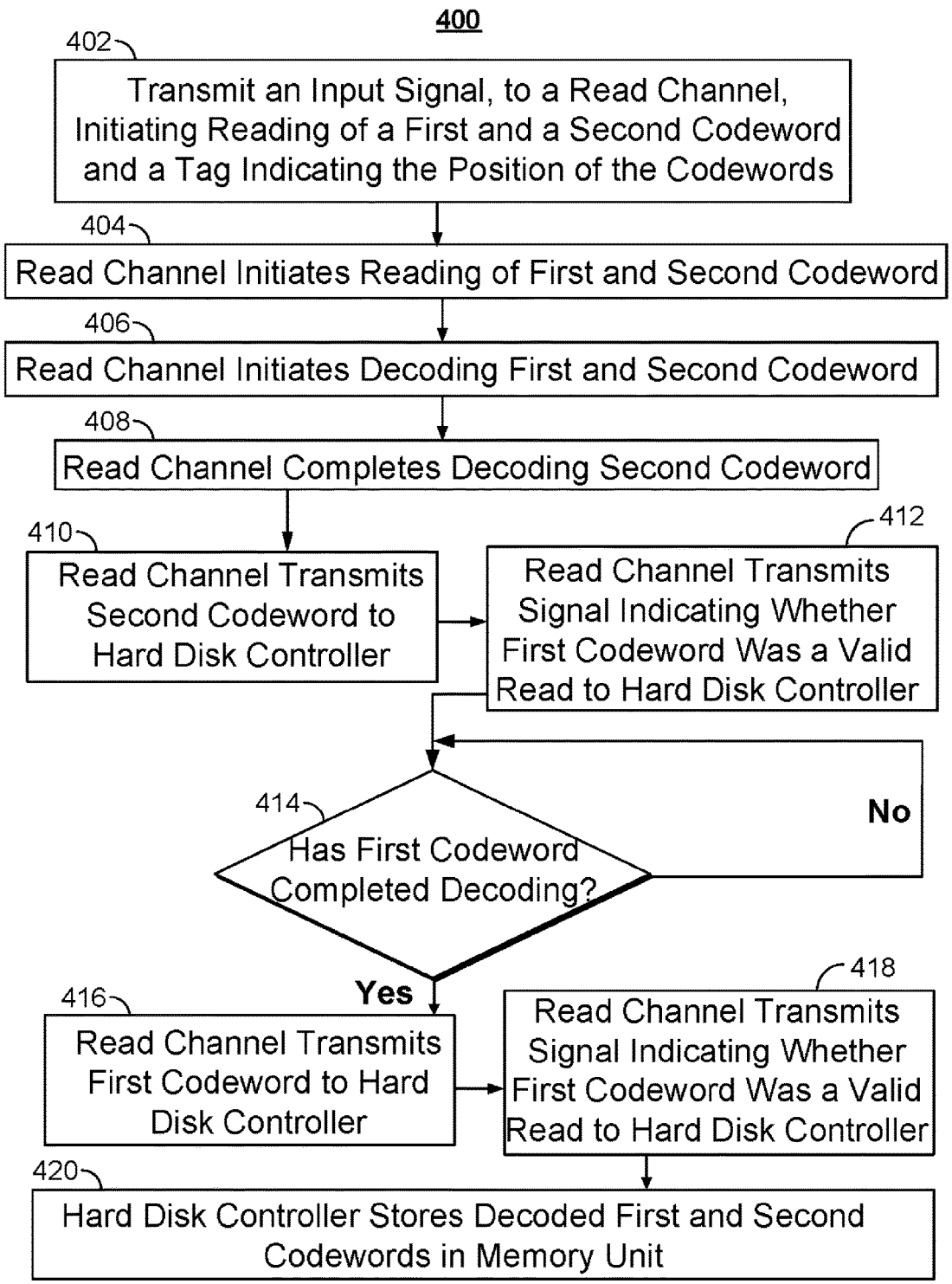
FIG. 4 shows the processes used by the decoding system of FIG. 1 to read and decode codewords efficiently in accordance with several embodiments of the present disclosure.

FIG. 4 shows the processes used by the decoding system of FIG. 1 to read and decode codewords efficiently. At 402, host controller 106 transmits an input signal, to read channel 104, initiating reading of a first codeword and a second codeword. Host controller 106 also transmits a tag indicating the position of the codeword to read channel 104. For example, hard disk controller 106 transmits RGATE 202 to read channel specifying the order in which to read the first and the second codeword, indicating that the first codeword will be read before the second codeword. Hard disk controller 106 also generates and transmits RGATE TAG 212 which contains tag identifiers that identify which codeword is specified by each pulse on the RGATE signal. This tag is used throughout the reading and decoding process to keep track of the codeword even though codewords may be transmitted out of order based on when codewords complete decoding.

At 404, read channel 104 initiates reading of the first codeword and the second codeword. For instance, after receiving RGATE 202 read command and RGATE TAG 212, read channel accesses the relevant sectors of storage 102 specified in the read command and reads the first and the second codewords specified in the read command in the order specified. Read channel sends instructions, as signal 112, to storage 102 upon receiving and processing RGATE 202 and RGATE TAG 212. Storage 102 transmits the read first and second codewords 124 to read channel 104.

At 406, read channel 104 initiates decoding of the first and the second codeword. For instance, multi-decoder engine 120 which is a component of read channel 104, receives the first codeword and the second codeword and may begin decoding them in parallel.

At 408, read channel completes decoding the second. codeword. For instance, the second codeword may have a higher SNR than the first codeword and therefore the second codeword completes decoding earlier.

At 410, read channel 104 transmits the decoded second codeword to hard disk controller 106. As soon as decoder 120 completes decoding of the codeword, read channel 104 transmits the decoded codeword and the RDATA signal to hard disk controller 106.

At 412, read channel 104 transmits a signal indicating whether the second codeword was a valid read to hard disk controller 106. For instance, read channel 104 transmits RDV pulses corresponding to the second codeword that indicates whether that second codeword was properly decoded. If the second codeword was successfully decoded, hard disk controller 106 registers a valid read of the second codeword.

At 414, read channel 104 determines whether decoder 120 has finished decoding the first codeword. If decoder 120 has not finished decoding the first codeword, read channel 104 continues to wait until decoder 120 completes decoding of the codeword.

At 416, read channel 104 transmits the decoded first codeword to hard disk controller 106 in response to determining that decoder 120 has completed decoding of the first codeword. As soon as decoder 120 completes decoding of the first codeword, read channel 104 transmits the decoded first codeword and the RDATA signal to hard disk controller 106.

At 418, read channel 104 transmits a signal indicating whether the first codeword was a valid read to hard disk controller 106. For instance, read channel 104 transmits RDV pulses corresponding to the first codeword that indicates whether the first codeword was properly decoded. If the first codeword was successfully decoded, hard disk controller 106 registers a valid read of the first codeword.

At 420, hard disk controller 106 stores the decoded first and second codewords in memory unit 108. Once a valid read is registered by hard disk controller 106 for each of the first and second codewords, hard disk controller 106 transmits the decoded first and second. codewords to memory unit 108, which may be located off chip.

It will be understood that the foregoing is only illustrative of the principles of the invention, and that the invention can be practiced by other than the described embodiments, which are presented for purposes of illustration and not of limitation, and the present invention is limited only by the claims which follow.

What is claimed is:

1. A method of reading data from a storage device, the method comprising:
   reading, based on a read command, a first codeword and a second codeword from the storage device, wherein the second codeword is read after the first codeword according to the read command;
   decoding the first codeword and the second codeword in parallel, wherein the decoding of the second codeword completes before the decoding of the first codeword completes; and
   transmitting, to control circuitry, before the decoding of the first codeword completes, the decoded second codeword and a first signal indicating whether decoding of the second codeword is complete, wherein the first signal has a first length based on whether decoding of the second codeword is complete and successful and based on the size of the storage device sector in which the second codeword is located, and wherein the first signal has a second length based on whether decoding of the second codeword is complete and not successful.

2. The method of claim 1, wherein the signal indicating whether decoding of the second codeword is complete includes a tag identifying the position of each codeword with respect to other codewords in the storage device.

3. The method of claim 1 further comprising the control circuitry transmitting an input signal, to the storage device, initiating the first codeword and the second codeword to be read from the storage device, wherein the input signal includes a tag identifying the order in which the first codeword and the second codeword are to be decoded.

4. The method of claim 1, further comprising the control circuitry storing the second codeword in a memory unit once the second codeword has been decoded.

5. The method of claim 1, further comprising transmitting a second signal that indicates a position of the second codeword with respect to the first codeword.

6. The method of claim 1, further comprising:
determining, at the control circuitry, that the second codeword has been decoded and that the decoding of the first codeword has not completed; and
transmitting, to the control circuitry, a minimum length signal indicating that the first codeword has not completed decoding.

7. The method of claim 2, wherein the control circuitry determines the position of the decoded second codeword by matching the decoded second codeword with the tag included in the signal indicating whether decoding of the second codeword is complete.

8. The method of claim 3, wherein the decoding of the first codeword and the second codeword is attempted based on the order specified in the input signal.

9. The method of claim 5, wherein the control circuitry determines whether decoding of the second codeword has completed based on the length of the signal indicating whether decoding of the second codeword is complete.

10. The method of claim 6, wherein the minimum length signal indicating that the first codeword has not completed decoding is included in the signal indicating whether decoding of the second codeword is complete.

11. The method of claim 1, further comprising:
transmitting, to the control circuitry, the decoded first codeword and a signal indicating whether decoding of the first codeword is complete, wherein the signal indicates a position of the first codeword with respect to the second codeword.

12. A system for reading data from a storage device, the system comprising:
a read channel configured to:
read, based on a read command, a first codeword and a second codeword from the storage device, wherein the second codeword is read after the first codeword according to the read command;
decode the first codeword and the second codeword in parallel, wherein the decoding of the second codeword completes before the decoding of the first codeword completes; and
transmit, to control circuitry, before the decoding of the first codeword completes, the decoded second codeword and a first signal indicating whether decoding of the second codeword is complete, wherein the first signal has a first length based on whether decoding of the second codeword is complete and successful and based on the size of the storage device sector in which the second codeword is located, and wherein the first signal has a second length based on whether decoding of the second codeword is complete and not successful.

13. The system of claim 12, wherein the signal indicating whether decoding of the second codeword is complete includes a tag identifying the position of each codeword with respect to other codewords in the storage device.

14. The system of claim 12, wherein the control circuitry is further configured to transmit an input signal, to the storage device, initiating the first codeword and the second codeword to be read from the storage device, wherein the input signal includes a tag identifying the order in which the first codeword and the second codeword are to be decoded.

15. The system of claim 12, wherein the control circuitry is further configured to store the second codeword in a memory unit once the second codeword has been decoded.

16. The system of claim 12, wherein the read channel is further configured to transmit a second signal that indicates a position of the second codeword with respect to the first codeword.

17. The system of claim 12, wherein:
the control circuitry is further configured to determine that the second codeword has been decoded and that the decoding of the first codeword has not completed; and
the read channel is further configured to transmit, to control circuitry, a minimum length signal indicating that the first codeword has not completed decoding.

18. The system of claim 13, wherein the control circuitry determines the position of the decoded second codeword by matching the decoded second codeword with the tag included in the signal indicating whether decoding of the second codeword is complete.

19. The system of claim 14, wherein the decoding of the first codeword and the second codeword is attempted based on the order specified in the input signal.

20. The system of claim 16, wherein the control circuitry determines whether decoding of the second codeword has completed based on the length of the signal indicating whether decoding of the second codeword is complete.

21. The system of claim 17, wherein the minimum length signal indicating that the first codeword has not completed decoding is included in the signal indicating whether decoding of the second codeword is complete.

22. The system of claim 12, wherein:
the read channel is further configured to transmit, to the control circuitry, the decoded first codeword and a signal indicating whether decoding of the first codeword is complete, wherein the signal indicates a position of the first codeword with respect to the second codeword.

* * * * *